(12) United States Patent
Caveney

(10) Patent No.: US 9,483,059 B2
(45) Date of Patent: Nov. 1, 2016

(54) METHOD TO GAIN DRIVER'S ATTENTION FOR AUTONOMOUS VEHICLE

(71) Applicant: Toyota Motor Engineering & Manufacturing North America, Inc., Erlanger, KY (US)

(72) Inventor: Derek S. Caveney, Plymouth, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/554,291

(22) Filed: Nov. 26, 2014

(65) Prior Publication Data

US 2016/0146618 A1 May 26, 2016

(51) Int. Cl.
*G01C 21/34* (2006.01)
*G05D 1/06* (2006.01)

(52) U.S. Cl.
CPC .................................. *G05D 1/06* (2013.01)

(58) Field of Classification Search
None
See application file for complete search history.

(56) References Cited

U.S. PATENT DOCUMENTS

| | | | | |
|---|---|---|---|---|
| 5,813,993 | A * | 9/1998 | Kaplan | A61B 5/0476 600/26 |
| 6,748,302 | B2 * | 6/2004 | Kawazoe | G05D 1/0246 340/937 |
| 7,679,496 | B2 | 3/2010 | Beneker et al. | |
| 8,248,270 | B2 | 8/2012 | Nieves | |
| 8,554,408 | B2 | 10/2013 | Springer et al. | |
| 8,698,639 | B2 * | 4/2014 | Fung | B60K 28/06 340/576 |
| 8,909,428 | B1 * | 12/2014 | Lombrozo | B62D 15/025 701/41 |
| 2004/0164851 | A1 * | 8/2004 | Crawshaw | B60Q 9/008 340/435 |
| 2004/0262063 | A1 * | 12/2004 | Kaufmann | B62D 1/286 180/169 |
| 2005/0115753 | A1 * | 6/2005 | Pemberton | G08G 1/164 180/167 |
| 2008/0080740 | A1 * | 4/2008 | Kaufmann | G08G 1/167 382/104 |
| 2008/0183342 | A1 * | 7/2008 | Kaufmann | B60K 28/066 701/1 |
| 2008/0270018 | A1 * | 10/2008 | Citelli | B60K 31/0008 701/532 |
| 2009/0091435 | A1 * | 4/2009 | Bolourchi | B60K 28/066 340/435 |
| 2010/0172542 | A1 * | 7/2010 | Stein | G06K 9/00798 382/103 |
| 2010/0228417 | A1 | 9/2010 | Lee et al. | |
| 2012/0226418 | A1 | 9/2012 | Veen et al. | |
| 2012/0283939 | A1 | 11/2012 | Bobbitt, III | |
| 2013/0084847 | A1 * | 4/2013 | Tibbitts | H04W 8/245 455/419 |
| 2013/0342365 | A1 | 12/2013 | Kiefer et al. | |
| 2014/0309927 | A1 * | 10/2014 | Ricci | B60Q 1/00 701/424 |

* cited by examiner

*Primary Examiner* — Truc M Do
(74) *Attorney, Agent, or Firm* — Christopher G. Darrow; Darrow Mustafa PC

(57) ABSTRACT

A computer-implemented method for the automated driving of a vehicle. The method may include coordinating a planned vehicle path using a path planner application. The path planner application may receive information based on inputs to sensors disposed on the vehicle. The method may include sending a command to one or more vehicle systems to control the vehicle to follow the planned vehicle path. While the vehicle follows the planned vehicle path, the method may include receiving an indication that the path planner application is not meeting a threshold performance level. After receiving the indication that the path planner application is not meeting the threshold performance level, a command is sent to one or more vehicle systems to control the vehicle to follow a temporary and irregular full vehicle movement to alert a vehicle driver. The temporary and irregular full vehicle movement may be a full vehicle side-to-side wobbling movement.

18 Claims, 4 Drawing Sheets

METHOD TO GAIN DRIVER'S ATTENTION FOR AUTONOMOUS VEHICLE

TECHNICAL FIELD

The present disclosure generally relates to methods for autonomous driving and, more particularly, to methods for gaining the attention of a driver to indicate a need for manual control of a vehicle.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Partially-automated or monitored driving systems are designed to assist drivers in operating a vehicle safely and efficiently on the road. For example, they may use techniques such as eye-tracking of the driver to send a warning when the driver becomes inattentive, lane tracking of the vehicle to send a warning to the driver when the vehicle is leaving its lane, and controlling vehicle velocity based on distance to a vehicle ahead of the driver when adaptive cruise control is activated by the driver.

Fully or highly automated driving systems are preferably designed to operate a vehicle on a road without driver interaction or other external control, for example, in self-driving or autonomous vehicles. Advanced driver safety systems may monitor the situation of a vehicle, including its location, as well as a location of other vehicles in its vicinity. However, fully automated driving systems are not currently designed to notify the driver of upcoming vehicle operations in order to prepare the driver in terms of what to expect from the automated driving system's control of the vehicle While certain systems may provide haptic feedback in the form of a vibrating steering wheel, textual warnings within the interior of a vehicle, or audible warnings requesting attention from the driver, such warnings may, in fact, be insufficient to alert the driver. Still further, certain warnings may be overbearing or distracting to the point of causing alarm on the part of the driver.

Accordingly, it would be desirable to provide improved and reliable warning means to gain the attention of a driver of an autonomous vehicle when the need arises for the manual control of the vehicle or for another action that needs input from the driver.

SUMMARY

This section provides a general summary of the disclosure, and is not a comprehensive disclosure of its full scope or all of its features.

In various aspects, the present teachings provide a computer-implemented method for the automated driving of a vehicle. The method may include coordinating a planned vehicle path using a path planner application, and directing the vehicle to follow the planned vehicle path. In various aspects, the method includes receiving information from one or more sensors of the vehicle. Where it is determined that the information from the one or more sensors is not sufficient to meet a threshold performance level, the method includes initiating a temporary and irregular movement to alert a driver of the vehicle, such as a full vehicle side-to-side wobbling movement.

In other aspects, the present teachings provide an automated driving system for a vehicle. The system may include one or more sensors disposed on a vehicle, and a computing device in communication with the one or more sensors. The computing device may include one or more processors for controlling the operations of the computing device, and memory for storing data and program instructions used by the one or more processors. The one or more processors may be configured to execute instructions stored in the memory. The system may determine, using a path planner application receiving information based on inputs to the one or more sensors, a planned vehicle path. The system may send a command to one or more vehicle systems to control the vehicle to follow the planned vehicle path. Periodically, the system may determine whether the path planner application is meeting a threshold performance level. If the path planner application is not meeting the threshold performance level, the system may send a command to the one or more vehicle systems to control the vehicle to initiate a temporary and irregular full vehicle movement to alert a driver of the vehicle.

In still other aspects, the present teachings provide a computer-implemented method for the automated driving of a vehicle. The method may include coordinating a planned vehicle path using a path planner application. The path planner application may receive information based on inputs to one or more sensors disposed on the vehicle. The method may include sending a command to one or more vehicle systems to control the vehicle to follow the planned vehicle path. The method may also include monitoring the planned vehicle path, and periodically determining whether the path planner application is meeting a threshold performance level. If the path planner application is not meeting the threshold performance level, the method may include sending a command to one or more vehicle systems to control the vehicle to initiate a temporary and irregular full vehicle movement to alert a driver of the vehicle.

Further areas of applicability and various methods of enhancing mapping technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

Figure 1:
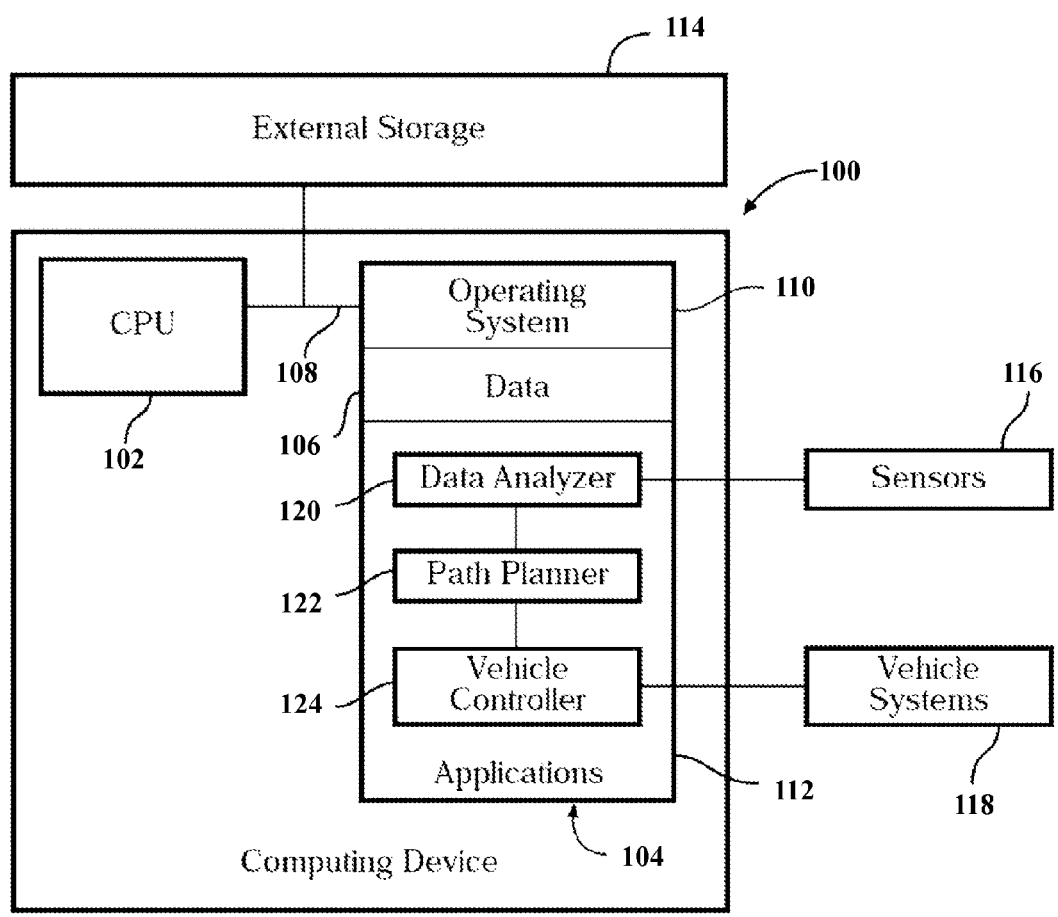
FIG. 1 is a block diagram of an exemplary computing device that may be used in assisting an automated driving system.

It should be noted that the figures set forth herein are intended to exemplify the general characteristics of materials, methods, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The following description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment is included in at least one embodiment or aspect. The appearances of the phrase "in one aspect" (or variations thereof) are not necessarily referring to the same aspect or embodiment.

The present technology generally relates to an automated driving system of a vehicle that is able to gain the attention of a driver by initiating a temporary and irregular full vehicle movement. As used herein, it should be understood that the term vehicle should not be construed narrowly, and should include all types of vehicles, including a passenger car, truck, motorcycle, off-road vehicle, bus, boat, airplane, helicopter, lawn mower, recreational vehicle, amusement park vehicle, farm vehicle, construction vehicle, tram, golf cart, train, or trolley.

Automated driving systems can be configured to determine or otherwise follow a planned vehicle path using a path planner application and send commands, for example, through a vehicle controller, to various vehicle systems to control the vehicle to follow the planned vehicle path. In certain aspects, if an indication is received that the path planner application is not meeting a threshold performance level, the automated driving system can be configured to provide a notification to a driver of the vehicle to take control of the vehicle if the path planner application is not meeting the threshold performance level. For example, the present technology provides the means for a driver to receive timely, non-intrusive instruction from the autonomous vehicle that manual control or input will shortly be required. As discussed in more detail below, the instruction may be provided in the form of a wobbling motion of the entire vehicle sufficient to alert or get the attention of a driver while minimizing unnecessary alarm on the part of the driver. It is envisioned that the present teachings provide safety features that improve the overall operation of the automated driving system as compared to prior art autonomous systems that may simply cancel operation of the automated driving system if the path planner application does not meet a threshold performance level.

According to various aspects of the present technology, once a system or computing device of the autonomous vehicle has been informed or has determined that either the path planner is operating below a predetermined threshold level, or that information regarding the surrounding environment has been degraded such that autonomous operation may not be possible or recommended for much longer, the vehicle can be configured to initiate an irregular full vehicle movement.

In various aspects, the vehicle may be commanded to steer in a slight back and forth, or wobbling manner, for a very brief period of time. This may provide a slight jiggling feeling to the driver in order to indicate that the driver may need to take over manual control of the vehicle, or that certain vehicle systems may need additional information. The irregular full vehicle movement, or wobbling, would preferably occur while the vehicle generally remains on its planned path. In one example, as will be explained in more detail below, lane lines or lane markers of a roadway may be occluded or partially removed from the pavement such that the vehicle may not be able to accurately recognize lane information in order to fully or adequately support autonomous driving. In another example, a vehicle controller or computing device may determine that certain locating algorithms are taking too long to process, and localization may not be occurring at a sufficient interval to accurately place the vehicle with respect to its surroundings. In yet another example, various systems may rely on the receipt of signals from satellites, and it may be determined that the reception is becoming sporadic, or the strength, quality, and/or reliability of the signals may be decreasing. In all of the above non-limiting examples, the vehicle may still be able to provide sufficient control means, but a degraded quality or clarity of the available information may soon require manual intervention to ensure future control. Thus in various aspects, the present teachings may also utilize the vehicle systems, controllers, or computing devices to determine a probability that a future threshold performance level can be met based on a current ability to analyze data or information from one or more vehicle sensors.

FIG. 1 is a block diagram of an exemplary computing device 100 that may be used for implementing the automated driving system. The computing device 100 can be any type of vehicle-installed, handheld, desktop, or other form of single computing device, or can be composed of multiple computing devices. The processing unit in the computing device can be a conventional central processing unit (CPU)

102 or any other type of device, or multiple devices, capable of manipulating or processing information. A memory 104 in the computing device can be a random access memory device (RAM) or any other suitable type of storage device. The memory 104 can include data 106 that is accessed by the CPU 102 using a bus 108.

The memory 104 can also include an operating system 110 and installed applications 112, with the installed applications 112 including programs that permit the CPU 102 to perform the automated driving methods described below. The computing device 100 can also include secondary, additional, or external storage 114, for example, a memory card, flash drive, or any other form of computer readable medium. The installed applications 112 can be stored in whole or in part in the external storage 114 and loaded into the memory 104 as needed for processing.

The computing device 100 can also be in communication with one or more sensors 116. The sensors 116 may be disposed on a vehicle and can capture data and/or signals for processing by an inertial measurement unit (IMU), a lane-keeping assist (LKA) system, a dead-reckoning system, an adaptive cruise control (ACC) system, a global navigation satellite system (GNSS) or global positioning system (GPS), a light detection and ranging (LIDAR) system, a radar system, a sonar system, an image-based sensor system, simultaneous localization and mapping (SLAM), visual-SLAM (VSLAM), or any other type of system capable of capturing information specific to the environment surrounding a vehicle, including information specific to objects such as other vehicles proximate to the navigation route of the vehicle, pedestrians, features of the route being traveled by the vehicle, landmarks, or other localized position data and/or signals and outputting corresponding data and/or signals to the CPU 102.

The sensors 116 can also capture data representative of changes in x, y, and z-axis position, velocity, acceleration, rotation angle, and rotational angular rate for the vehicle and similar data for objects or landmarks proximate to the navigation route of the vehicle. If the sensors 116 capture data for a dead-reckoning system, data relating to wheel revolution speeds, travel distance, steering angle, and steering angular rate of change can be captured. If the sensors 116 capture signals for a GNSS or GPS, a receiver can calculate vehicle position and velocity estimated in global coordinates. A plurality of satellites can be used to estimate the vehicle's position and velocity using three-dimensional tri-angulation and time estimation.

If the sensors 116 capture data for a LIDAR system, ranging data relating to intensity or reflectivity returns of the environment surrounding the vehicle can be captured. In various examples, the sensors 116 can capture, at least: data for a dead-reckoning system, ACC system, or other system that estimates vehicle velocity, acceleration, deceleration, position, and orientation; signals for a GNSS or other system that determines vehicle position and velocity; and data for a LIDAR system, LKA system, or other system that measures vehicle distance from lane lines (e.g., route surface markings or route boundaries), obstacles, objects, or other environmental features including traffic lights and road signs. The computing device 100 can also be in communication with one or more vehicle systems 118, such as vehicle braking systems, vehicle steering systems, vehicle propulsion systems, etc. The vehicle systems 118 can also be in communication with the sensors 116, the sensors 116 being configured to capture data indicative of performance of the vehicle systems 118.

With respect to the example computing device 100 as described with reference to FIG. 1, the applications 112 stored in the memory 104 may include at least a data analyzer 120, a path planner 122, and a vehicle controller 124. In general, data captured by the sensors 116 can be used by one or more of these applications 112 to understand the environment surrounding the vehicle, plan one or more potential vehicle paths for autonomous operation of the vehicle along a navigation route for the vehicle, improve positional accuracy of the vehicle, and send commands to the various vehicle systems 118 to change the current operating characteristics of the vehicle.

Figure 2A:
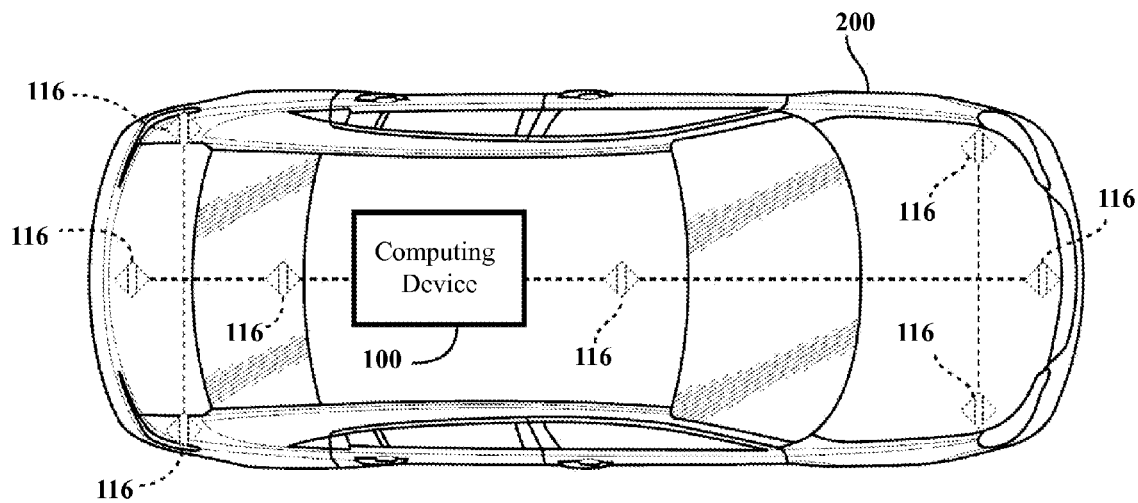
FIG. 2A is a schematic illustration of a vehicle including the computing device of FIG. 1.

FIG. 2A shows a schematic of a vehicle 200 including the computing device 100 described in FIG. 1. The computing device 100 can be located within the vehicle 200 as shown in FIG. 2A or can be located remotely from the vehicle 200 in an alternate location (not shown). If the computing device 100 is located remotely from the vehicle 200, the vehicle 200 can include the capability of communicating with the computing device 100.

The vehicle 200 can also include a plurality of sensors, such as the sensors 116 described in reference to FIG. 1. One or more of the sensors 116 shown can be configured to capture changes in velocity, acceleration, wheel revolution speed, and distance to objects within the surrounding environment for use by the computing device 100 to estimate position and orientation of the vehicle 200, steering angle for a dead-reckoning system, images for processing by an image sensor, vehicle position in global coordinates based on signals from a plurality of satellites, or any other data and/or signals that could be used to determine the current state of the vehicle or determine the position of the vehicle 200 in respect to its environment.

For example, if the sensors 116 are configured to capture data for use by a LIDAR system, the sensors 116 can capture data related to laser returns from physical objects in the area surrounding the vehicle 200 with ranging distances calculated by measuring the time it takes for a signal to return to the sensor 116. Laser returns can include the backscattered light reflected by objects hit by a source of light, e.g. laser light, being emitted by the sensors 116 or another source on or proximate to the vehicle 200. Once the light is reflected by an object, the sensors 116 can capture intensity values and reflectivity of each point on the object to be used for analyzing and classifying the object, for example, by the data analyzer 120, one of the applications 112 stored within or accessible to the computing device 100.

The data analyzer 120 briefly described in FIG. 1 can analyze data and/or signals captured by the one or more sensors 116 by, for example, filtering noise, extracting features for clustering, and/or classifying and tracking objects. The data analyzer 120 can also process data from the one or more sensors 116 such that the data is configured for use by the other various applications 112 used to implement the automated driving system, such as the path planner 122.

In certain aspects, at least one of the sensors 116 can capture signals for use with a global navigation satellite system, a global positioning system, or a receiver for use with one of the systems. As such, the data analyzer 120 may be configured to analyze the quality of signals received from satellites for use with a GNSS or GPS. The vehicle may include one or more processors configured to determine that the path planner application is not capable of meeting a threshold performance level when the global navigation satellite system or a global positioning system fails to properly perform or meet predetermined minimum standards. The vehicle may also have a processor configured to determine a probability whether a future threshold performance level can be met based on a current ability to analyze data from the one or more sensors receiving satellite signals.

In various other aspects, the data analyzer 120 may be configured to analyze the quality and clarity of digital images that may be obtained from a camera sensor 115. For example, the data analyzer may be able to analyze and review data or information pertaining to the sharpness, contrast, patterns, spatial frequencies, quality, resolution, noise, and other features or metrics of objects, particularly proximate objects, landmarks, lane marking information, and lane markers or lane indicators, which are located within an image. When LIDAR, SLAM, or VSLAM systems are used, the data analyzer 120 may be configured to ascertain the accuracy of the systems to map-match the vehicle 200 to the environment. For example, where landmarks 322 (FIG. 3) in the environment may be used to determine location. In various aspects, the vehicle 200 includes at least one processor configured to determine that the path planner application 122 is not capable of meeting a threshold performance level when the LIDAR, SLAM, or VSLAM system fails to map-match the vehicle with landmarks according to predetermined minimum standards.

Thus, the data analyzer may not only detect the presence or absence of indicators such as lane markings, but may be configured to analyze the quality of the indicators or markings. For example, the quality of data may be monitored and/or periodically analyzed in order to detect any occlusion, degradation, or loss of quality of the indicators that may signal a likelihood of a future failure mode or the probability that the quality, accuracy, and/or reliability of the data may get worse or ultimately not be able to support features or systems that may be required for autonomous driving.

The path planner 122 can be configured to determine the navigation route for the vehicle 200 to follow based on the vehicle's 200 current location in respect to the surrounding environment as well as any points of destination chosen, for example, by the driver of the vehicle 200. The path planner 122 can thus determine the navigation route for the vehicle 200 based on data received from the data analyzer 120.

The vehicle controller 124 can be configured to send commands to one or more vehicle systems 118 in order to maintain the navigation route indicated by the path planner 122. In one example, the vehicle controller 124 can be a propulsion controller configured to send a command to the engine throttle to move the position of a throttle plate based on the position of an accelerator pedal or a brake pedal. In another example, the vehicle controller 124 can send commands to a traction control system to implement steering changes or a hybrid control system to redistribute a power ratio between electric and gas power sources. As another example, the vehicle controller 124 can be an electronic stability controller configured to send a command to activate one of the front or rear brakes if either more or less yaw motion (rotation around the vehicle's 200 vertical axis) is detected than optimum for the current angle of the steering wheel. In yet another aspect, the vehicle controller 124 can be a steering controller configured to initiate the temporary and irregular full vehicle movement, such as side-to-side wobbling, to alert a driver of the vehicle.

Figure 2B:
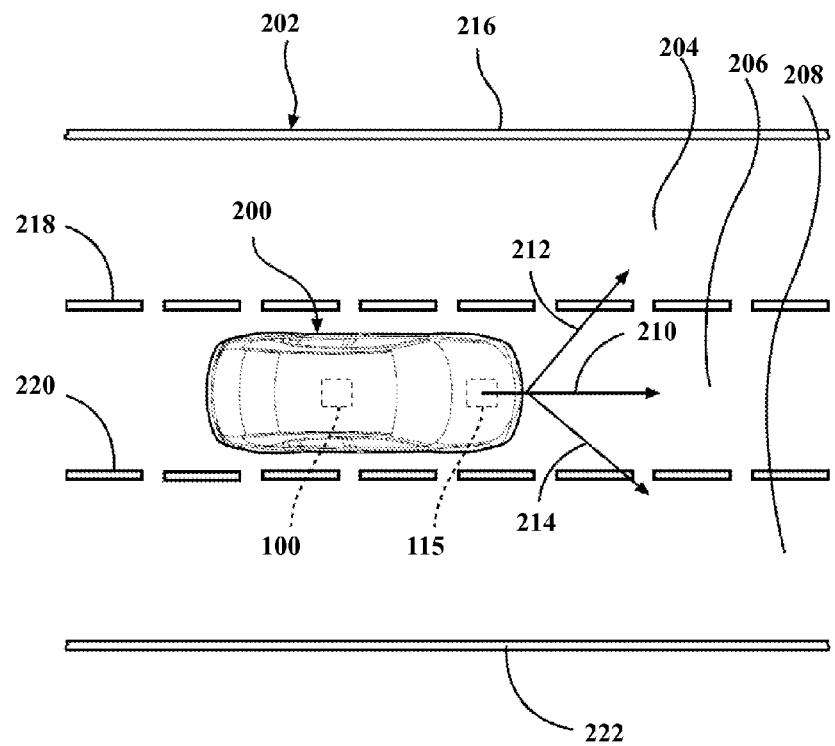
FIG. 2B is a schematic representation of the vehicle of FIG. 2A traveling in a forward direction along a roadway containing multiple lanes.

In FIG. 2B, the vehicle 200 is illustrated moving in a forward direction along an exemplary roadway 202 that contains multiple side-by-side lanes, with three lanes 204, 206, and 208 being shown by example. It shown be understood that the roadway 202 may contain as few as one lane and up four or more lanes.

In one aspect, a sensor may include a camera 115 having a field of view directed to the front, to the left side and to the right side of the vehicle as respectively shown by the directional arrows 210, 212 and 214. This arrangement allows the camera 115 to detect surface features of the roadway 202, such as lane markers. The roadway 202 can be a highway or freeway with typical lane markers, such as a solid continuous lane marker 216 at the left edge (in the direction of vehicle travel) of the left most lane 204, dashed lane markers 218 and 220 respectively defining the right edge of the left most lane 204 and the right edge of the middle lane 206. The right most lane 208 is delimited at a right edge by a solid continuous lane marker 222. The camera 115 can have the field of view shown in FIG. 2B where a camera 115 can obtain an image of the lane marker type to the immediate left side and to the immediate right side of the vehicle, such as lane markers 218 and 220 for the position of the vehicle 200 in FIG. 2B in the middle lane 206. Alternately, when the camera 115 has a larger field of view, lane marker types at the far edges of the adjacent lanes, such as the lane markers 202 or 220 can also be obtained by the camera 115 or another suitable sensor.

The camera 115 may be a black and white or color camera capable of sending images of the lane markers detected within the field of view of the camera 115 to the processor 102 which may determine the lane marker type, (e.g. solid or dashed) from the camera images.

If a color camera 115 is employed, the typical yellow or white colors of the lane markers may also be detected in the images from the camera 115 and sent to the processor 102 to aid in identifying the lane marker type as being either solid or dashed.

In certain aspects, map data can also be provided as digital map information and stored in the memory 104 of the computing device 100, stored in the external storage 114, or can be made available to the processor 102 from a remote location, such as by wireless transmission from a digital map data source. The map data can include the existence and the location of stubs or splits in a roadway, as well as the distance of the stubs from predetermined locations along the roadway in advance of each stub. The map data may also assist in the location of lane markers, points of interest, and other data that may be available for collection by one of the sensors 116.

In various aspects, map data may also include vehicle-driving history information based on prior travels of vehicle along a particular segment of a roadway. Such data can be stored in the memory 104 or, in the external storage 114 or uploaded to a remote data memory. In various aspects, the data analyzer 122 may compare currently obtained data with historical data and alert the driver to discrepancies as warranted.

Figure 3:
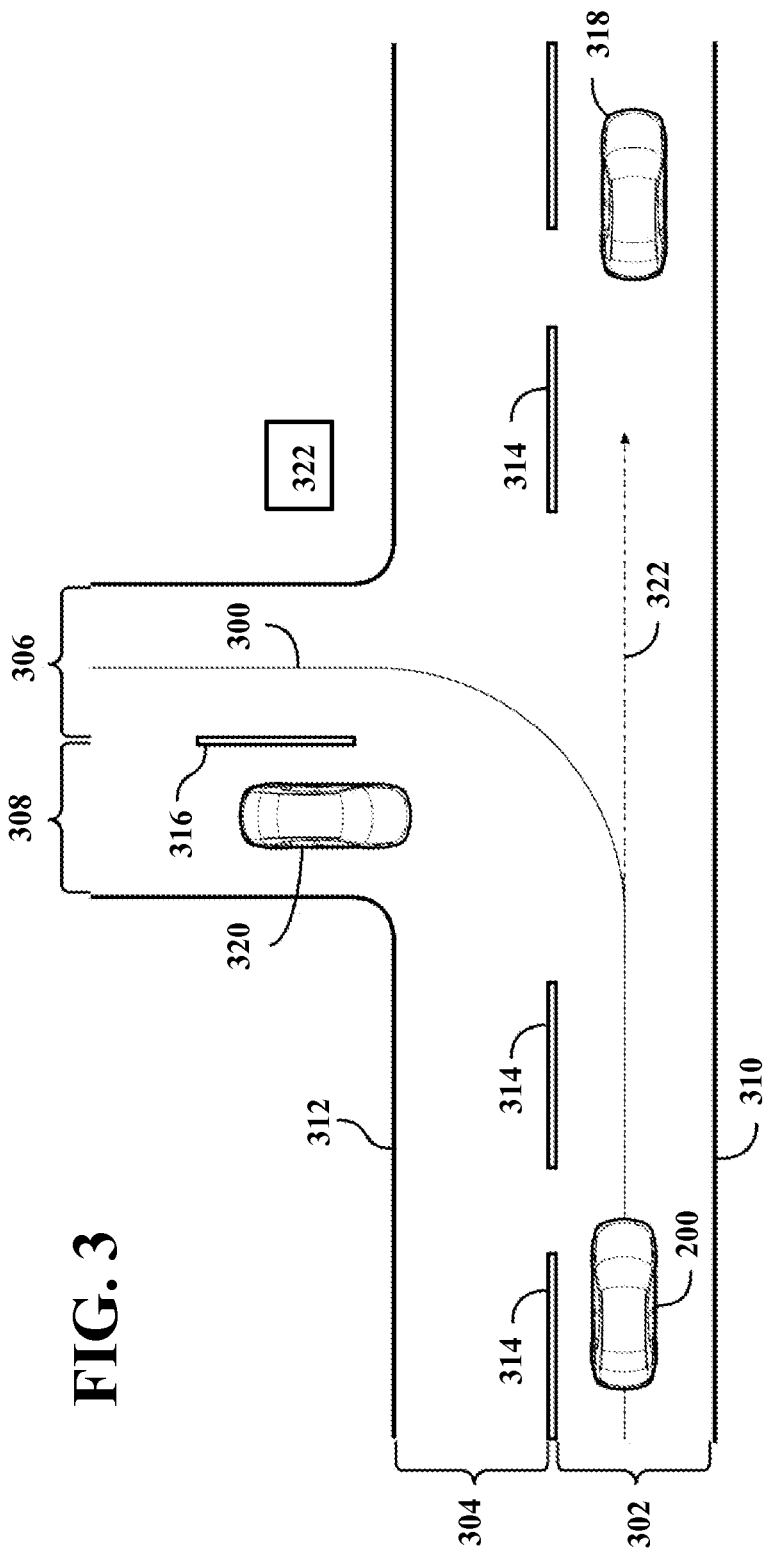
FIG. 3 illustrates an exemplary portion of a navigation route being traversed by the vehicle of FIG. 2A and an example planned vehicle path along the portion of the navigation route.

FIG. 3 shows an example portion of a navigation route being traversed by the vehicle 200 of FIG. 2A and an example planned vehicle path 300 along the portion of the navigation route. The example navigation route shown in FIG. 3 has the vehicle 200 turning from a first road including two lanes 302, 304 to a second road including two lanes 306, 308 at an intersection. Each of the lanes 302, 304, 306, 308 is formed between lane edge features, such as a curbs 310, 312 and dashed lane markings 314, 316. For example, lane 302 extends between curb 310 and dashed lane marking 314. These lane edge features can be recognized by the path planner 122 using map information corresponding to the location of the vehicle 200 and data captured by the sensors 116 disposed on the vehicle 200 and compared to the map information. The map information can be stored in the memory 104 of the computing device 100 or can be available to the path planner 122 from a remote location.

In the example navigation route of FIG. 3, the data analyzer 120 and path planner 122 can determine that the lanes 302, 304 are designed for vehicular travel in opposite directions as are the lanes 306, 308. The data analyzer 120 and the path planner 122 can also determine that other objects, such as vehicles 318, 320 are proximate to the planned vehicle path 300 along this portion of the navigation route. The data analyzer 120 and the path planner 122 can also use lane information available as part of the map information or as captured by the sensors 116, such as lane edge features, number of lanes, and overall width of the lanes, to determine the planned vehicle path 300 before the vehicle 200 encounters a given portion of the navigation route. The map information, can, for example, be built from data collected using a LIDAR sensor and manipulated using a simultaneous localization and mapping (SLAM) technique to build the map. The map information can also be gathered from a route network definition file (RNDF) or other source. The planned vehicle path 300 can also be determined using a numerical optimization technique.

The path planner 122 may calculate the planned vehicle path 300 and can communicate with the vehicle controller 124 such that the vehicle controller 124 can send commands to various vehicle systems 118 to implement the planned vehicle path 300. In order to provide a high level of safety in autonomous operation of the vehicle 200, the calculations made within the path planner 122 can be analyzed to determine whether the path planner 122 meets a threshold performance level. The threshold performance level, can, for example, be based on the calculations performed by the path planner 122 meeting at least a predetermined accuracy score. The accuracy score for the path planner 122 can be measured, for example, by another of the applications 112 in the computing device 100, in order to determine whether the path planner 122 is achieving at least a threshold level of performance as it determines the planned vehicle path 300 and sends commands to the vehicle controller 124.

In one example, the accuracy score of the path planner 122 can be measured based on the time it takes for computations to be completed by the path planner 122. If the time it takes for the path planner 122 to compute the planned vehicle path 300 for the vehicle 200 is longer than a predetermined one-half second threshold, for example, the accuracy score given to the path planner 122 can be low, indicating that the path planner 122 is not meeting the threshold performance level. In another example, the accuracy score of the path planner 122 can be measured based on the distance between the planned vehicle path 300 and a detected obstacle, such as the vehicle 320. If the distance between the planned vehicle path 300 and the detected obstacle, e.g. the vehicle 320, is less, for example, than one meter, the accuracy score given to the path planner 122 can be low, again indicating that the path planner 122 is not meeting the threshold performance level. In instances where the path planner 122 is not meeting the threshold performance levels, a command can be sent to one or more vehicle systems to initiate the temporary and irregular vehicle movement in order to alert the driver of the vehicle. Notably, the threshold performance levels described here, that is, one-half second for time and one meter for distance, are non-limiting examples.

In certain systems, if a path planner application, such as the path planner 122, was determined to be operating below a threshold performance level, autonomous operation of the vehicle 200 would be halted, and the vehicle controller 114 would either stop receiving instructions from the path planner 122 and/or receive new instructions indicating that the vehicle controller 144 should command various vehicle systems 118 to implement safety protocols to slow the vehicle 200 along its current trajectory. An example of a prior art trajectory of the vehicle 200 after a prior art path planner 122 was determined to be operating below a threshold performance level is shown using projected vehicle path 322 in dotted line. Projected vehicle path 322 shows that the vehicle 200 would continue to move straight within the lane 302 instead of following the planned vehicle path 300 if the path planner 122 was found to operate below a threshold performance level because the steering wheel would return to a neutral position when the vehicle controller 114 stops sending commands to, for example, the steering system. Projected vehicle path 322 is not desirable given that the planned vehicle path 300 along the navigation route shown in FIG. 3 includes a turn from the lane 302 to the lane 306.

In the improved automated driving system described here, if the computing device 100 receives an indication that the path planner 122 is not meeting a threshold performance level, the CPU 102 of the computing device 100 can be configured to send a command to one or more of the vehicle systems to control the vehicle to initiate the temporary and irregular full vehicle movement. In operation, the path planner 122 can have the capacity to predict the required maneuvers of the vehicle 200 for a fixed amount of lead time, for example, one to five seconds, though prediction capability can vary.

In addition to initiating the temporary and irregular full vehicle movement, the CPU 102 of the computing device 100 can be configured to send a secondary notification to a driver of the vehicle 200 to take control of one or more vehicle systems 118 in response to receiving some indication that the path planner 122 is not meeting the threshold performance level. The secondary notification to the driver can be an audible warning, such as a chime, bell, or statement played by an audio system, a tactile warning, such as haptic feedback provided through some portion of the interior of the vehicle 200 to the driver, or a visual warning, such as a textual warning displayed to the driver or a light or sequence of lights displayed to the driver that indicate to the driver that the driver should intervene to take control of one or more vehicle systems 118 from the automated driving system.

As initiating a temporary and irregular vehicle movement, such as a side-to-side wobbling movement may have a limited capability in terms of keeping the vehicle 200 along the previously intended navigation route, the secondary notification to the driver to take over operation of various vehicle systems 118 may serve as a safety measure for transition from autonomous operation of the vehicle 200 to manual operation. If the computing device 100 receives an indication that the driver of the vehicle 200 has taken control of the one or more vehicle systems 118 to operate the vehicle 200 in response to receiving the notification that the path planner 122 is not meeting the threshold performance level, the CPU 102 can be configured to disable the automated driving system.

Another safety measure may include sending a command to the vehicle controller 124 and the various vehicle systems 118 to control the vehicle 200 according to existing vehicle safety protocols if a threshold amount of time has been reached after sending the secondary notification to the driver of the vehicle 200 to take control, and, for example, no indication has been received that the driver has taken over control of various vehicle systems 118. Vehicle safety protocols can include implementing a lane following system, an obstacle detection system, an adaptive cruise control system, etc. Vehicle safety protocols that allow transition from fully autonomous operation to partially autonomous operation or manual operation of the vehicle 200 are designed to avoid a shutdown of the vehicle 200 as it traverses its navigation route, further improving the safety level associated with the automated driving system.

Figure 4:
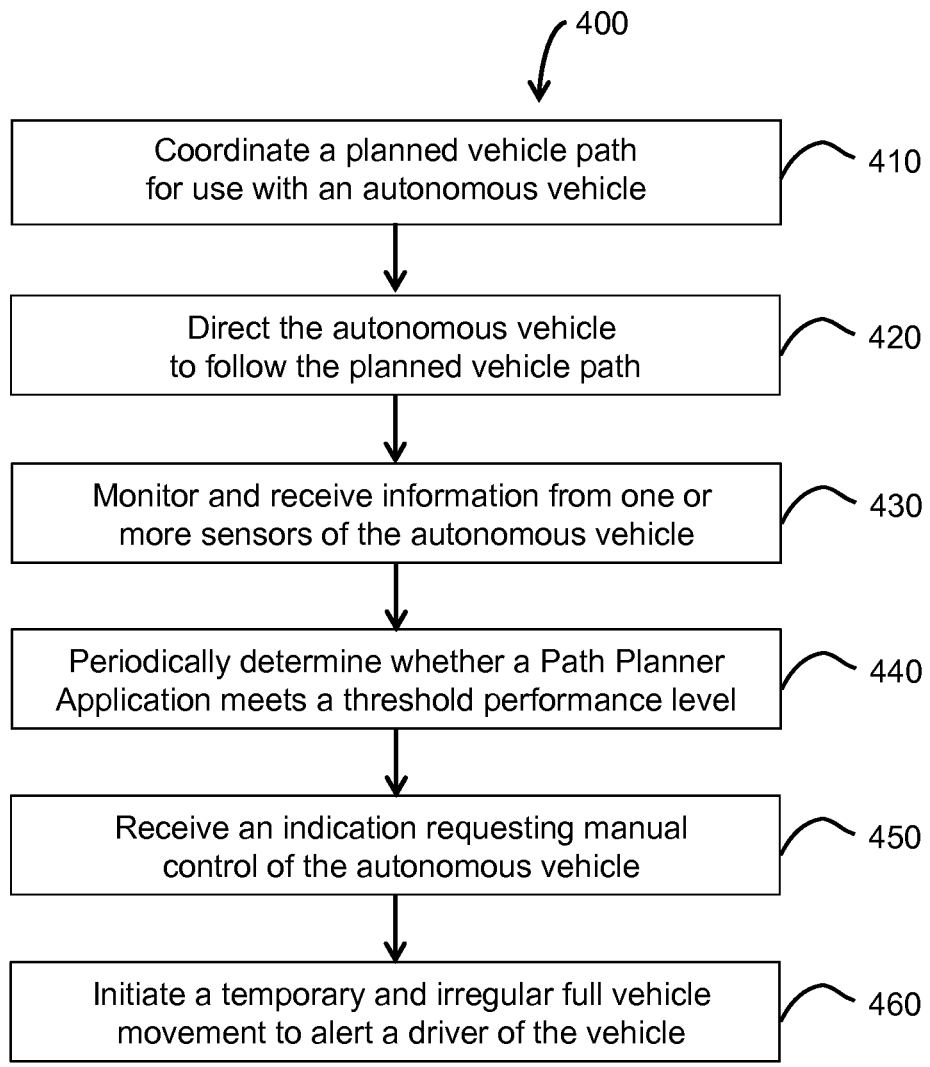
FIG. 4 is a high-level flow chart illustrating a system and method for gaining the attention of a driver of an autonomous vehicle.

FIG. 4 is an exemplary flow chart illustrating logic that may be useful with a system and method 400 for gaining the attention of a driver of an autonomous vehicle. The flow chart and logic of FIG. 4 is a non-limiting example, and does not include each aspect of the present technology. It should also be understood that the logic or steps do not have to be carried out in the same order as depicted, and not each step is required. In one aspect, and as illustrated by step 410 in FIG. 4, the present technology may include the automated driving system coordinating or determining, optionally using a path planner application such as path planner 122, a planned vehicle path for use with an autonomous vehicle, such as the planned vehicle path 300 as shown in FIG. 3. In various aspects, the determination of the planned vehicle path can be based on analysis of the navigation route for the vehicle 200 and/or analysis of information specific to the environment surrounding the vehicle, such as proximate object information and lane information such as lane indicators and lane markers, as described herein.

With reference to step 420 of the method 400, the automated driving system can send a command to one or more vehicle systems, such as the vehicle systems 118 shown in FIG. 1, to control and direct the vehicle 200 to follow the planned vehicle path. The path planner 122 can communicate with a vehicle controller 124 that, in turn, may communicate with various vehicle systems 118 to implement various vehicle maneuvers that allow the vehicle 200 to follow the planned vehicle path provided by the path planner 122, for example, the planned vehicle path 300 shown in FIG. 3.

In step 430 of the method 400, the automated driving system may monitor the vehicle and the planned vehicle path, and receive information from one or more sensors of the autonomous vehicle, for example, regarding the integrity of the data contained in images of road conditions from a camera 115. In certain aspects, images of various lane markers 218, 220, 314, 316 may be monitored and analyzed with respect to sharpness and clarity, as described above, to ensure they meet predetermined minimum standards. Step 440 illustrates the periodic determination of whether a path planner application is meeting one or more predetermined threshold performance levels. Notably, it is envisioned that the predetermined minimum standards or threshold performance levels may vary based on known or unknown road conditions, traffic, vehicle type, location, weather, prior driving history, specific driver characteristics, etc.

Based on the analysis and with reference to step 450, the automated driving system can receive an indication that the path planner application, e.g. path planner 122, is either not meeting a threshold performance level as the vehicle 200 follows the planned vehicle path, or will soon not be able to meet a threshold performance level as may be determined based on the incoming data that is currently being received. Thus, the analysis may also include the determination of a probability of whether a future threshold performance level can be met based on a current ability to analyze data from one or more of the vehicle sensors that may be used to control the operation of the vehicle or determination of the vehicle path.

Determining whether the path planner application meets a threshold performance level can additionally or alternatively include determining whether the path planner application meets a predetermined accuracy score for calculations performed by the path planner application. In one example, the accuracy score can be computed based on the amount of processing time required by the path planner application to calculate the planned vehicle path. If the processing time is longer than one of a threshold, predetermined, or normally expected amount of time for the calculations to be completed, a low accuracy score can be given. A low accuracy score is one that is not associated with safe operation of the automated driving system. The automated driving system may rely on efficient operation of the path planner application in order to maintain safe operation of the vehicle 200 along the navigation route.

As shown in step 450 of the method 400, the automated driving system may receive an indication or command requesting the need or potential need of manual control of the autonomous vehicle by a driver. Upon receipt of such an indication, the automated driving system can send a command to one or more vehicle systems to control the vehicle to initiate a temporary and irregular vehicle movement in order to alert a driver or passenger of the vehicle, as shown by step 460. In various examples, the vehicle movement may be commanded steer in a slight back and forth motion that includes a side-to-side wobbling movement of the entire vehicle. The wobbling movement would be just enough movement to gain the attention of a driver, for example, a short intermittent variation that automatically returns the vehicle to follow the planned vehicle path after the movement.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A computer-implemented method for automated driving of a vehicle, the method comprising:
coordinating a planned vehicle path using a path planner application;
controlling the automated driving of the vehicle by directing the vehicle to follow the planned vehicle path;
receiving information from one or more sensors of the vehicle;
determining that the information from the one or more sensors is not sufficient to meet a threshold performance level by determining a probability whether a future threshold performance level can be met based on a current ability to analyze data from the one or more sensors; and
controlling the automated driving of the vehicle by initiating a full vehicle side-to-side wobbling movement to alert a driver of the vehicle.

2. The method of claim 1, wherein at least one of the one or more sensors comprises a camera, and the step of receiving information from the one or more sensors of the vehicle comprises obtaining images of lane markers.

3. The method of claim 2, wherein the vehicle comprises one or more processors configured to:

analyze at least one of a sharpness quality and a clarity quality of the lane markers; and determine that the path planner application is not capable of meeting a threshold performance level when at the least one of the sharpness quality and the clarity quality of the lane markers fails to meet predetermined minimum standards.

4. The method of claim 1, wherein at least one of the one or more sensors captures signals for use with a global navigation satellite system or a global positioning system, and the vehicle comprises one or more processors configured to:

determine that the path planner application is not capable of meeting a threshold performance level when the global navigation satellite system or the global positioning system fails to meet predetermined minimum standards.

5. The method of claim 1, wherein at least one of the one or more sensors captures signals for use with a light detection and ranging system, and the vehicle comprises one or more processors configured to:

determine that the path planner application is not capable of meeting a threshold performance level when the light detection and ranging system fails to map-match the vehicle with landmarks according to predetermined minimum standards.

6. The method of claim 1, wherein at least one of the one or more sensors comprises a camera, and the step of receiving information from the one or more sensors of the vehicle comprises obtaining images of landmarks for use with a simultaneous localization and mapping system, and the vehicle comprises one or more processors configured to:

determine that the path planner application is not capable of meeting a threshold performance level when the simultaneous localization and mapping system fails to map-match the vehicle with landmarks according to predetermined minimum standards.

7. An automated driving system for a vehicle, the system comprising:

one or more sensors disposed on a vehicle; and a computing device in communication with the one or more sensors, the computing device comprising:

one or more processors for controlling operations of the computing device; and memory for storing data and program instructions used by the one or more processors, wherein the one or more processors are configured to execute instructions stored in the memory to:

receive inputs from the one or more sensors to determine, using a path planner application, a planned vehicle path based on the inputs;

control the vehicle by sending a command to one or more vehicle systems to follow the planned vehicle path;

periodically determine whether the path planner application is meeting a threshold performance level by determining a probability that a future threshold performance level can be met based on a current ability to analyze data from the one or more sensors; and when the path planner application is not meeting the threshold performance level, control the vehicle by sending a command to the one or more vehicle systems to initiate a temporary and irregular full vehicle movement to alert a driver of the vehicle.

8. The system of claim 7, wherein the one or more processors are further configured to:

after sending the command to the one or more vehicle systems to control the vehicle to initiate the temporary and irregular full vehicle movement, send a secondary notification to the driver of the vehicle to take control of the one or more vehicle systems.

9. The system of claim 8, wherein the one or more processors are further configured to:

after sending the secondary notification to the driver of the vehicle to take control of the one or more vehicle systems, receive an indication that the driver of the vehicle has taken control of the one or more vehicle systems; and in response to the indication that the driver of the vehicle has taken control of the one or more vehicle systems, disable the automated driving system.

10. The system of claim 7, wherein the command to the one or more vehicle systems to control the vehicle to initiate a temporary and irregular full vehicle movement comprises:

directing a full vehicle side-to-side wobbling movement.

11. The system of claim 10, further comprising:

sending a command for the vehicle to continue following the planned vehicle path after the temporary and irregular full vehicle movement.

12. The system of claim 7, wherein the one or more processors are further configured to perform at least one of:

analyzing a navigation route of the vehicle; and analyzing information specific to an environment surrounding the vehicle including at least one of proximate object information, landmarks, and lane marking information.

13. The system of claim 7, wherein the one or more sensors disposed on the vehicle comprises a camera configured to obtain images of lane markers, and wherein the one or more processors are further configured to:

analyze at least one of a sharpness quality and a clarity quality of the lane markers; and determine that the path planner application is not capable of meeting a threshold performance level when at the least one of the sharpness quality and the clarity quality of the lane markers fails to meet predetermined minimum standards.

14. A computer-implemented method for automated driving of a vehicle, the method comprising:

receiving information based on inputs from one or more sensors disposed on a vehicle;

using the information received from the inputs and coordinating, using a path planner application, a planned vehicle path;

controlling the vehicle by sending a command to one or more vehicle systems for the vehicle to follow the planned vehicle path;

monitoring the planned vehicle path, and periodically determining whether the path planner application is meeting a threshold performance level by determining a probability that a future threshold performance level can be met based on a current ability to analyze data from the one or more sensors; and when the path planner application is not meeting the threshold performance level, controlling the vehicle by sending a command to one or more vehicle systems to initiate a temporary and irregular full vehicle movement to alert a driver of the vehicle.

15. The method of claim 14, wherein the temporary and irregular full vehicle movement comprises a full vehicle side-to-side wobbling movement.

16. The method of claim 15, wherein the full vehicle side-to-side wobbling movement is an intermittent variation that automatically returns the vehicle to follow the planned vehicle path after the movement.

17. The method of claim 14, wherein the vehicle comprises one or more camera sensors configured to obtain images of lane markers, and monitoring the planned vehicle path comprises:
    analyzing at least one of a sharpness quality and a clarity quality of the lane markers; and
    determining whether the path planner application is capable of meeting a threshold performance level when at the least one of the sharpness quality and the clarity quality of the lane markers fails to meet predetermined minimum standards.

18. The method of claim 14, wherein the threshold performance level is based on meeting at least a predetermined accuracy score for calculations performed by the path planner application.

\* \* \* \* \*